United States Patent Office 3,635,951
Patented Jan. 18, 1972

3,635,951
PREPARATION OF AZEPINE DERIVATIVES
Donald A. Tyssee and John P. Petrovich, St. Louis, Mo.,
assignors to Monsanto Company, St. Louis, Mo.
No Drawing. Filed Sept. 18, 1969, Ser. No. 859,209
Int. Cl. C07b 1/00; C07d 41/02
U.S. Cl. 260—239 B
13 Claims

ABSTRACT OF THE DISCLOSURE

Hexamethylenimine (2,3,4,5,6-hexahydroazepine) is produced by bringing tetrahydropyran-2-methanol, hydrogen and ammonia in the vapor phase into contact with a catalyst consisting essentially of a reducing metal and a dehydration material at temperatures between about 150° to 550° C. Partially hydrogenated azepine is produced when the process is carried out in the absence of hydrogen and the reducing metal. Hexamethylenimine is useful as a component in insecticide and herbicide formulations. Partially hydrogenated azepine may be converted to aminohexanol or hexamethylenimine.

BACKGROUND OF THE INVENTION

It is known that hexamethylenimine is formed as a by-product in commercial processes presently employed for the production of hexamethylenediamine in which either adiponitrile is reduced or 1,6-hexanediol is aminated. However, these processes are a roundabout and expensive means for producing hexamethylenimine and, moreover, the yield thereof obtained by these processes is poor.

An object of the invention is to provide a novel process for producing seven-membered, heterocyclic organic compounds containing six carbon and one nitrogen atoms.

More specifically, an object of the present invention is to provide a novel process for producing hexamethylenimine in good yield.

Another specific object of the invention is to provide a direct and economical process for produicng hexamethylenimine.

Still another specific object of the invention is to provide a novel process for producing partially hydrogenated azepine.

SUMMARY OF THE INVENTION

The objects of the invention are accomplished by the process which comprises bringing tetrahydropyran-2-methanol, hydrogen, and ammonia in the gaseous state into contact with a catalyst consisting essentially of at least one reducing metal and at least one dehydration material at between about 150° C. and 550° C.

According to one aspect of the invention, partially hydrogenated azepine, i.e.,

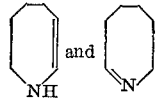

is produced by carrying out the process in the absence of hydrogen and the reducing metal.

The conversion of tetrahydropyran-2-methanol to hydrogenated azepine compounds, e.g., hexamethylenimine, according to the process of the invention is surprising and unexpected in view of the prior art. In U.S. Pat. 2,480,990 a process is described for converting tetrahydropyran-2-methanol to formylcyclopentane (a five-membered ring compound) which comprises passing tetrahydropyran-2-methanol in the vapor phase over a dehydration catalyst. Thus, by carrying out the process of the present invention the expected product would be cyclopentylmethylamine rather than hydrogenated azepine compounds (seven-membered ring compounds).

DESCRIPTION OF THE PREFERRED EMBODIMENTS

The catalyst used in the process can be characterized as consisting essentially of a reducing metal and a dehydration material. More specifically, the catalyst consists essentially of either (1) at least one reducing metal deposited on a support which is composed of at least one dehydration material or (2) an admixture of at least one reducing metal deposited on an inert support and at least one dehydration material. Suitable reducing metals include cobalt, nickel, palladium, platinum, ruthenium, rhodium, and iridium. Suitable dehydration materials include silica-alumina; silica-alumina-containing materials, such as zeolites; alumina; and kieselguhr. Inert supports include carbon and the like. The reduicng metal may comprise up to 5% by weight of the catalyst when rhodium, ruthenium, platinum or palladium are used, e.g., 0.1 to 5%, and up to 60% by weight of the catalyst when nickel or cobalt are used. Suitable silila-alumina supports for use in carrying out the invention include those which contain from 10 to 30% alumina and 90 to 70% silica. Catalyst promoters, such as chromium or zirconium may be used, if desired.

The process is carried out in the vapor phase at temperatures ranging from about 150° to 550° C. with temperatures from about 300° to 450° C. being preferred. Any appropriate apparatus may be employed although the process is most conveniently carried out in an apparatus adapted for continuous operations. Thus, a stream comprising tetrahydropyran-2-methanol, hydrogen, and ammonia is passed into a suitably heated tubular reactor packed with catalyst. Conveniently, the tetrahydropyran-2-methanol is volatilized in a preheater prior to introduction into the reactor. The process may be carried out at near atmospheric or subatmospheric pressures so long as the reactants are in the vapor phase and there is a sufficient pressure differential across the reactor to maintain a flow of materials.

The rate at which the tetrahydropyran-2-methanol, hydrogen, and ammonia are each fed into the reactor may vary over a wide range, e.g., the volume ratio of hydrogen to ammonia may vary from 100:1 to 1:1. Generally, a ratio between 20:1 to 1:1 produces satisfactory results. The feed ratio of ammonia gas to tetrahydropyran-2-methanol may also vary considerably, for example, between 6000:1 to 100:1 depending on the conversion of tetrahydropyran-2-methanol desired. Generally, a ratio between 2000:1 to 300:1 is satisfactory.

The rate at which the feed material is introduced into the reactor will depend on the size of the reactor, the particular catalyst employed and the reaction conditions, i.e., pressure and temperature.

The following examples are given to more fully illustrate the invention. However, the examples are not intended to in any way limit the invention.

EXAMPLE 1

A stainless steel, ½-inch reactor tube was packed to a depth of 13 inches with a granular catalyst consisting of 10% by weight of nickel deposited on a 13% alumina-87% silica support. The catalyst was heated to and maintained at 325° C. Ammonia (100 ml./min.), hydrogen (1750 ml./min.) and vaporous tetrahydropyran-2-methanol (10 ml./hr. of liquid) were continuously fed into the reactor at sufficient pressure to maintain the indicated flow rate of material through the reactor. The reactor effluent was analyzed by gas chromatography (GC). The analysis showed that about 10% of the tetrahydropyran-2-methanol was converted to products of which 65.8% was hexamethylenimine, i.e., at 10% tetrahydropyran-2-methanol conversion and a 65.8% hexamethylenimine selectivity were obtained.

EXAMPLE 2

The procedure of Example 1 was repeated with the exception that the catalyst was maintained at 350° C. In this instance a 40% tetrahydropyran-2-methanol conversion and a 60.5% hexamethylenimine selectivity were obtained.

EXAMPLES 3–12

In each of these examples the procedure of Example 1 was followed with the exception that different catalysts were employed and in certain instances different flow rates of feed material and/or catalyst temperature. The results obtained and the variations employed, where different from Example 1, are given in the following table. In the table the expressions THPM, HMI and $k$ refer to tetrahydropyran - 2 - methanol, hexamethylenimine and kieselguhr, respectively.

TABLE

| Example | Catalyst | Catalyst temp., C. | $H_2$, ml./min. | $NH_3$, ml./min. | THPM, ml./hr. | THPM conversion | HMI selectivity |
|---|---|---|---|---|---|---|---|
| 3 | 55% Ni/k | 300 | 2,000 | 100 | 10 | 12 | 25 |
| 4 | 10% Co/SiO$_2$-Al$_2$O$_3$ | 300 | 2,000 | 100 | 10 | 11 | 30 |
| 5 | 40% Co/k | 325 | 2,000 | 100 | 10 | 24 | 20 |
| 6 | 1.0% Ru/SiO$_2$-Al$_2$O$_3$ | 315 | 1,750 | 100 | 10 | 20 | 68 |
| 7 | 1.0% Ru/k | 335 | 1,750 | 100 | 10 | 32 | 60 |
| 8 | 1.0% Ru/Al$_2$O$_3$ | 300 | 2,000 | 100 | 10 | 27 | 72 |
| 9 | 1.0% Pt/k | 330 | 1,750 | 100 | 10 | 25 | 63 |
| 10 | 1.0% Pt/SiO$_2$-Al$_2$O$_3$ | 315 | 1,750 | 100 | 10 | 20 | 65 |
| 11 | 0.3% Pd/Al$_2$O$_3$ | 305 | 2,000 | 100 | 10 | 37 | 78 |
| 12 | 1.0% Pd/zeolite | 320 | 1,750 | 100 | 10 | 42 | 75 |

EXAMPLE 13

A reactor, as used in Example 1, was packed to a depth of 13 inches with catalyst consisting of 13% alumina-87% silica. Vaporous tetrahydropyran-2-methanol (10 ml./hr. of liquid) and ammonia (200 ml./min.) were fed into the reactor while the catalyst was maintained at 325° C. The reactor effluent was analyzed by gas chromatography. The results of the analysis indicated that 32% of the tetrahydropyran-2-methanol was converted to products of which 82% was a partially hydrogenated azepine mixture consisting of 2,3,4,5-tetrahydroazepine and 2,3,4,5-tetrahydro-6H-azepine. Similar results are also obtained when kieselguhr or activated alumina ($\gamma$-Al$_2$O$_3$) is used instead of silica-alumina. The partially hydrogenated azepine compounds can be hydrolyzed and reduced to form 1-amino-6-hexanol or reduced to form hexamethylenimine.

EXAMPLE 14

A reactor, as described in Example 1, was packed to a depth of 13 inches with catalyst consisting of palladium deposited on activated alumina wherein the palladium composed 0.3% by weight of catalyst. Hydrogen (1750 ml./min.), ammonia (100 ml./min.) and tetrahydropyran-2-methanol (10 ml./hr. of liquid) were fed into the reactor at substantially atmospheric pressure and maintained at 320° C. The effluent from the reactor was collected in a flask cooled to −78° C. by means of a Dry Ice/acetone bath. Hexamethylenimine was then separated from the resulting liquid by means of fractional distillation. Based on the moles of tetrahydropyran-2-methanol fed into the reactor at 45% tetrahydropyran-2-methanol conversion and a 72% hexamethylenimine selectivity were obtained.

EXAMPLE 15

The procedure of Example 1 was repeated with the following variations:

Catalyst: an admixture of palladium and chromium deposited on activated alumina and silica-alumina (palladium composed 0.25% of the catalyst; chromium present as a promoter).
Ammonia feed rate: 200 ml./min.
Hydrogen feed rate: 1500 ml./min.
Catalyst temperature: 300° C.

Vapor phase chromatography analysis of the reactor effluent showed that a 45% tetrahydropyran-2-methanol conversion and a 60% hexamethylenimine selectivity were obtained.

What is claimed is:

1. A process for converting tetrahydropyran-2-methanol to hexamethylenimine which comprises bringing tetrahydropyran-2-methanol, hydrogen and ammonia in the gaseous state into contact with a catalyst consisting essentially of at least one reducing metal and a least one dehydration material at a temperature between about 150° and 550° C.

2. The process of claim 1 wherein the reducing metal is selected from the group consisting of nickel, cobalt, palladium, platinum, rhodium, ruthenium, and iridium and the dehydration material is selected from the group consisting of silica-alumina, alumina, zeolite and kieselguhr.

3. The process of claim 1 wherein the temperature is between about 300° and 450° C.

4. The process of claim 3 wherein the reducing metal is nickel.

5. The process of claim 4 wherein the dehydration material is kieselguhr.

6. The process of claim 4 wherein the dehydration material is silica-alumina.

7. The process of claim 3 wherein the reducing metal is cobalt.

8. The process of claim 3 wherein the reducing metal is palladium.

9. The process of claim 8 wherein the dehydration material is a zeolite.

10. A process for preparing 2,3,4,-5-tetrahydroazepine and 2,3,4,5 - tetrahydro - 6H - azepine which comprises bringing tetrahydropyran-2-methanol and ammonia in the gaseous state into contact with a catalyst consisting of at least one dehydration material at a temperature between about 150° and 550° C.

11. The process of claim 10 wherein the temperature is between about 300° and 450° C.

12. The process of claim 11 wherein the dehydration material is selected from the group consisting of kieselguhr, silica-alumina, alumina, and a zeolite.

13. The process of claim 12 wherein the catalyst is kieselguhr.

References Cited

UNITED STATES PATENTS 3,270,059   8/1966   Winderl et al. _____ 260—239

FOREIGN PATENTS 738,448   7/1943   Germany _____ 260—239

ALTON D. ROLLINS, Primary Examiner